(12) United States Patent
Kitahara et al.

(10) Patent No.: US 11,170,547 B2
(45) Date of Patent: Nov. 9, 2021

(54) COMBINE, METHOD OF GENERATING FIELD FARMING MAP, PROGRAM FOR GENERATING THE FIELD FARMING MAP AND STORAGE MEDIUM RECORDING THE FIELD FARMING MAP GENERATING PROGRAM

(71) Applicant: Kubota Corporation, Osaka (JP)

(72) Inventors: Mao Kitahara, Sakai (JP); Kazuhiro Takahara, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 16/614,960

(22) PCT Filed: Jun. 22, 2018

(86) PCT No.: PCT/JP2018/023791
§ 371 (c)(1),
(2) Date: Nov. 19, 2019

(87) PCT Pub. No.: WO2018/235942
PCT Pub. Date: Dec. 27, 2018

(65) Prior Publication Data
US 2020/0202596 A1 Jun. 25, 2020

(30) Foreign Application Priority Data

Jun. 23, 2017 (JP) .............................. JP2017-123438

(51) Int. Cl.
*G06T 11/60* (2006.01)
*A01B 79/00* (2006.01)
(Continued)

(52) U.S. Cl.
CPC ............ *G06T 11/60* (2013.01); *A01B 79/005* (2013.01); *A01D 41/127* (2013.01); *G06Q 50/02* (2013.01);
(Continued)

(58) Field of Classification Search
None
See application file for complete search history.

(56) References Cited

U.S. PATENT DOCUMENTS 5,923,270 A * 7/1999 Sampo ................. A01B 69/008
340/988
2013/0116883 A1 5/2013 Kormann
(Continued)

FOREIGN PATENT DOCUMENTS

JP H10304734 A 11/1998
JP H11155340 A 6/1999
(Continued)

*Primary Examiner* — Jennifer Mehmood
*Assistant Examiner* — Jed-Justin Imperial
(74) *Attorney, Agent, or Firm* — The Webb Law Firm

(57) ABSTRACT

Need exists for information management technique that allows utilization of collapsed grain culms detection for a future farming plan. A combine includes a machine body position calculation section for calculating a machine body position comprising map coordinates of a machine body, an image capturing section configured to image-capture a field at time of a harvesting work, an image recognition module configured to input image data of captured images acquired by the image capturing section and to estimate a collapsed grain culm area in the captured images and then to output recognition output data indicative of the estimated collapsed grain culm area, an evaluation module configured to output a produce evaluation value per unit traveling acquired by evaluating the agricultural produces that are harvested sequentially, a collapsed grain culm position information generation section configured to generate collapsed grain culm position information indicative of a position of the collapsed grain culm area on a map, based on the machine body position and the recognition output data and a harvest information generation section configured to generate harvest information from the machine body position at the time (Continued)

of harvest of the agricultural produces and the produce evaluation value.

4 Claims, 6 Drawing Sheets

(51) Int. Cl.
    *A01D 41/127*     (2006.01)
    *G06Q 50/02*     (2012.01)
    *G06T 7/00*     (2017.01)

(52) U.S. Cl.
    CPC .. *G06T 7/0012* (2013.01); *G06T 2207/10016* (2013.01); *G06T 2207/30188* (2013.01)

(56) References Cited

U.S. PATENT DOCUMENTS

2015/0242799 A1     8/2015   Seki et al.
2018/0177125 A1     6/2018   Takahara et al.

FOREIGN PATENT DOCUMENTS

| JP | 201610371 A | 1/2016 |
|---|---|---|
| JP | 201686668 A | 5/2016 |
| WO | 2014050524 A1 | 4/2014 |
| WO | 2016147521 A1 | 9/2016 |

\* cited by examiner

COMBINE, METHOD OF GENERATING FIELD FARMING MAP, PROGRAM FOR GENERATING THE FIELD FARMING MAP AND STORAGE MEDIUM RECORDING THE FIELD FARMING MAP GENERATING PROGRAM

CROSS-REFERENCE TO RELATED APPLICATIONS

This application is the United States national phase of International Application No. PCT/JP2018/023791 filed Jun. 22, 2018, and claims priority to Japanese Patent Application No. 2017-123438 filed Jun. 23, 2017, the disclosures of which are hereby incorporated by reference in their entirety.

TECHNICAL FIELD

The present invention relates to a combine capable of harvesting agricultural produces while traveling in a field and assisting farming based on a captured image obtained by an image capturing section. The invention relates also to a method of generating a field farming map using information obtained by such combine.

BACKGROUND ART

In a harvesting work by a combine, standing grain culms in a reaping season include not only those under an erect state, but also those under a collapsed state. In a harvesting work on standing grain culms under such collapsed state, a control different from one for a reaping work of standing grain culms under the erect state is required. For instance, a combine according to Patent Document 1 includes a television camera for capturing images of grain culms present in front of a reaping section and an image processing device. The image processing device compares an image from the TV camera with pre-stored images of erect states of various grain culms and detects a standing state of the grain culms. In this, if it is detected that some of the grain culms in front of the reaping section are collapsed, a raking reel is tilted with placing its grain culm collapsing side oriented downwards. This arrangement intends to improve reaping performance for collapsed grain culms.

In the case of a combine disclosed in Patent Document 2, based on a power spectrum distribution obtained based on captured images captured by an electronic camera which were acquired at the time of a reaping work, evaluation determination is made on collapsing degree of the standing grain culms prior to reaping. Then, in accordance with this collapsing degree, a control of e.g. vehicle speed will be effected at an appropriate timing, thus adjusting a threshing load, thereby to realize a smooth threshing work.

PRIOR-ART DOCUMENTS

Patent Documents

Patent Document 1: Japanese Unexamined Patent Application Hei. 11-155340 Publication Document
Patent Document 2: Japanese Unexamined Patent Application Hei. 10-304734 Publication Document

SUMMARY OF THE INVENTION

Problems to be Solved by Invention

With the combines according to Patent Document 1 and Patent Document 2, collapsed grain culms are detected at the time of reaping and harvesting work of agricultural produces and based on the result of this detection, a work traveling control is adjusted. Although harvesting of agricultural produces is done in repetition every year, the detection information of the collapsed grain culms at the time of reaping and harvesting work is utilized only at the time of that work. For instance, if the collapsed grain culms occur due to local excess of fertilizer (excess of nitrogen) or sunshine condition, it is also possible to seek for decrease of collapsed grain culms by utilizing the information indicative of position of the presence of collapsed grain culms in a plan of next planting and harvesting of agricultural produces, namely, in a farming plan.

In view of such state of the art, there is a need for information management technique that allows utilization of collapsed grain culms detection for a future farming plan.

Solution

According to a characterizing feature of the present invention, there is provided a combine for harvesting agricultural produces while traveling in a field, the combine comprising:

a machine body position calculation section for calculating a machine body position comprising map coordinates of a machine body based on positioning data from a satellite positioning module;

an image capturing section provided in the machine body and configured to image-capture the field at time of a harvesting work;

an image recognition module configured to input image data of captured images sequentially acquired continuously by the image capturing section and to estimate a collapsed grain culm area in the captured images and then to output recognition output data indicative of the estimated collapsed grain culm area;

an evaluation module configured to output a produce evaluation value per unit traveling acquired by evaluating the agricultural produces that are harvested sequentially;

a collapsed grain culm position information generation section configured to generate collapsed grain culm position information indicative of a position of the collapsed grain culm area on a map, based on the machine body position at the time of the acquisition of the captured image and the recognition output data; and a harvest information generation section configured to generate harvest information from the machine body position at the time of harvest of the agricultural produces and the produce evaluation value.

According to the present invention, if a collapsed grain culm is image-captured in a captured image, the image recognition module estimates a collapsed grain culm area from image data comprised of this captured image. Further, the machine body position calculation section has calculated a machine body position comprising map coordinates of a machine body at the time of acquisition of the captured image. Thus, based on this machine body position and the recognition output data indicative of the collapsed grain culm area, collapsed grain culm position information indicative of the position of the collapsed grain on the map is generated. Simultaneously, there is obtained a produce evaluation value per unit traveling acquired by evaluating the agricultural produces that are harvested sequentially, and from the machine body position at the time of harvesting of the agricultural produce and the produce evaluation value of the agricultural produce, harvest information is generated. As a result, the distribution of the collapsed grain culm area on the map can be confirmed from the collapsed grain culm position information and also the distribution of the produce evaluation value of the agricultural produce on the map can be confirmed from the harvest information. With comparison between the collapsed grain culm area distribution and the produce evaluation value distribution in the field, it becomes also possible, in the next agricultural produce cultivation, to decrease the amount of fertilization for the collapsed grain culm area and/or to adjust the planting amount. With use of the inventive combine described above, control for assisting harvesting work in consideration to the position of a collapsed grain culm on a map (the distance between the collapsed grain culm and the combine) is made possible as a matter of course. Moreover, it becomes also possible to obtain information for assisting the next farming plan.

In harvesting of agricultural produces, a yield which is a harvest amount and a taste value of the harvested produce become important evaluation amounts. In case the agricultural produce is wheat or rice, etc., a yield of grains charged into a tank per unit traveling distance (per unit time) or a moisture component or a protein component of grains harvested per unit traveling distance (per unit time) can be determined sequentially. Thus, according to one preferred embodiment of the present invention, the produce evaluation value includes a yield and/or a taste value. With this, it becomes possible to grasp a yield and/or a taste value, depending on the position of the collapsed grain culm area in the field and the position of the field.

According to one preferred embodiment of the present invention, a field farming map generation section for generating a field farming map by map-aligning the collapsed grain culm position information with the harvest information is constructed in a control system within the machine body or in a clouding computer system or a server or the like provided on a remote site. Such field farming map can be generated by combing the collapsed grain culm map indicative of distribution of a collapsed grain culm area per unit section of the field and a harvest map indicative of a yield and a taste per unit section of the field in such a manner that map coordinates or field coordinates thereof are aligned with each other. In case the field farming map was generated in the combine or in a communication terminal (a liquid crystal monitor, a tablet computer, a smartphone, etc.) attached to the combine, by uploading this field farming map in the cloud computing system, it may be accessed and used at any time and from any place. With reference to such field farming map, it becomes possible to analyze by unit section the produce evaluation value in the collapsed grain culm area. For example, if the produce evaluation value is a yield, from such field farming map, a difference of yields that can occur between a collapsed grain culm area and a non-collapsed grain culm area can be grasped clearly and easily, and such grasped difference can be referred to in a farming plan for e.g. future fertilization plan.

Moreover, it is also possible to upload such collapsed grain culm position information and the yield information generated in the combine to a cloud computing system and to generate a field farming map on the side of the cloud computing system. Incidentally, the term "cloud computing system" used herein is used generically to be inclusive of any system configured to provide each user with various kinds of information services either in a lump or in distribution with use of a computer network, thus being inclusive also of a conventionally server-client system as well as a personal information exchange system or the like.

The present invention claims for protection also a field farming map generating method for generating such field farming map as described above. Namely, a method of generating a field farming map, according to the present invention, comprises:

a step of outputting recognition output data indicative of a collapsed grain culm area estimated based on a captured image acquired by an image capturing section provided in a combine;

a step of generating collapsed grain culm position information indicative of a position on a map of the collapsed grain culm area from a machine body position at the time of the acquisition of the captured image and the recognition output data;

a step of outputting a produce evaluation value per unit traveling obtained by evaluating agricultural produces that are harvested sequentially by work traveling of the combine in a field;

a step of generating harvest information from the machine body position at the time of acquisition of the harvest of the agricultural produces and the produce evaluation value; and a step of generating the field farming map by map-aligning the collapsed grain culm position information with the harvest information.

With the present invention described above, when a combine is caused to work-travel (travel with carrying out a utility work simultaneously), collapsed grain culm position information and harvest information are generated. And, simply by map-aligning such collapsed grain culm position information and such harvest information with each other, a field farming map is generated. Incidentally, if the collapsed grain culm position information and the harvest information are generated with using map data constituting the basis common thereto, such map-aligning of the collapsed grain culm position information and the harvest information too will become unnecessary.

A field farming map generating program relating also to the present invention comprises:

a function of outputting recognition output data indicative of a collapsed grain culm area estimated based on a captured image acquired by an image capturing section provided in a combine;

a function of generating collapsed grain culm position information indicative of a position on a map of the collapsed grain culm area from a machine body position at the time of the acquisition of the captured image and the recognition output data;

a function of outputting a produce evaluation value per unit traveling obtained by evaluating agricultural produces that are harvested sequentially by work traveling of the combine in a field;

a function of generating harvest information from the machine body position at the time of acquisition of the harvest of the agricultural produces and the produce evaluation value; and a function of generating the field farming map by map-aligning combining the collapsed grain culm position information with the harvest information.

Still further, a storage medium recording therein a field farming map generating program relating also to the present invention, records therein a field farming generating program that causes a computer to realize:

a function of outputting recognition output data indicative of a collapsed grain culm area estimated based on a captured image acquired by an image capturing section provided in a combine;

a function of generating collapsed grain culm position information indicative of a position on a map of the collapsed grain culm area from a machine body position at the time of the acquisition of the captured image and the recognition output data;

a function of outputting a produce evaluation value per unit traveling obtained by evaluating agricultural produces that are harvested sequentially by work traveling of the combine in a field;

a function of generating harvest information from the machine body position at the time of acquisition of the harvest of the agricultural produces and the produce evaluation value; and a function of generating the field farming map by map-aligning the collapsed grain culm position information with the harvest information.

EMBODIMENT

Figure 1:
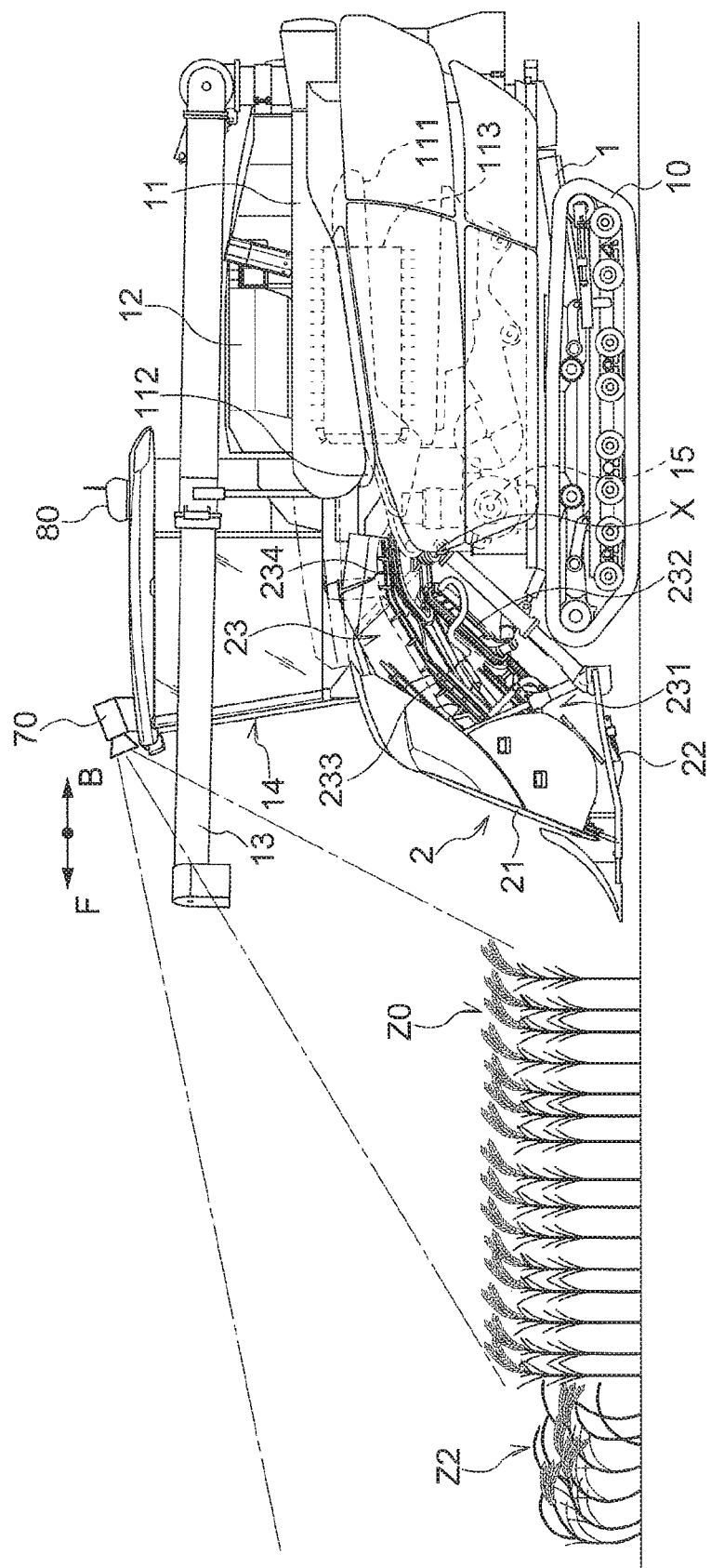
FIG. 1 is an overall side view of a combine.

Next, an embodiment of a combine as one example of a harvester machine relating to the present invention will be explained with reference to the accompanying drawings. In this embodiment, when the front/rear direction of a machine body 1 is to be defined, this definition is made along the machine body advancing direction in a work state. The direction denoted with a sign (F) in FIG. 1 is the machine body front side and the direction denoted with a sign (B) in FIG. 1 is the machine body rear side. Further, when the left/right direction of the machine body 1 is to be defined, the left and right sides are defined under a condition as seen in the machine body advancing (forward traveling) direction.

As shown in FIG. 1, in this combine, a reaping section 2 is connected to be liftable up/down about a horizontal axis X to a front portion of a machine body 1 having a pair of left and right crawler traveling devices 10. At a rear portion of the machine body 1, there are provided a threshing device 11 and a grain tank 12 for storing therein grains, side by side in the machine body lateral width direction. At a front right portion of the machine body 1, there is provided a cabin 14 which covers a driving section. Downwardly of this cabin 14, there is provided a driving engine 15.

As shown in FIG. 1, the threshing device 11 receives therein reaped grain culms which are reaped by the reaping section 2 and transported rearwards and effects a threshing treatment on their tips by a threshing cylinder 113 while conveying the culms with clamping the stem roots thereof between a threshing feed chain 111 and a clamping rail 112. And, in a sorting section provided downwardly of the threshing cylinder 113, a grain sorting treatment is effected on the threshed products. Grains which have been sorted in the sorting section will be conveyed to the grain tank 12 and stored in this grain tank 12. Further, though not detailed herein, there is provided a grain discharging device 13 for discharging the grains stored in the grain tank 12 to the outside.

In the reaping section 2, there are provided a plurality of raiser devices 21, a clipper type cutter device 22, a grain culm conveying device 23, etc. The raiser device 21 raises a collapsed standing grain culm. The cutter device 22 cuts the stem root of a raised standing grain culm. The grain culm conveying device 23 gradually changes the posture of the vertically postured reaped grain culm whose stem root has been cut off to a horizontally collapsed posture and conveys this culm toward a starting end portion of the threshing feed chain 111 which is located on the machine body rear side.

The grain culm conveying device 23 includes a merging conveying section 231, a stem root clamping conveying device 232, a tip retaining conveying device 233, a feeding conveying device 234, etc. The merging conveying section 231 is configured to gather a plurality of planting rows of reaped grain culms reaped by the cutter device 22 to the center in the cutting width direction and convey them. The stem root clamping conveying device 232 is configured to clamp the stem roots of the gathered reaped grain culms and convey them to the rear side. The tip retaining conveying device 233 is configured to retain and convey the tip sides of the reaped grain culms. The feeding conveying device 234 is configured to guide the stem roots of the reaped grain culms from the terminating end portion of the stem root retaining conveying device 232 toward the threshing feed chain 111.

At the front end of the ceiling portion of the cabin 14, there is provided an image-capturing section 70 having a color camera. The range in the front/rear direction of the image-capturing field of the image-capturing section 70 extends from the front end region of the reaping section 2 to almost reach the horizontal. The width-wise range of the image-capturing field ranges from about 10 m to a few tens of meters. A captured image acquired by the image-capturing section 70 is processed into image data, which will then be sent to a control system of the combine.

The image-capturing section 70 image-captures the field at the time of a harvest work. The control system of the combine has a function of recognizing a collapsed grain culm as a recognition target from the image data transmitted from the image-capturing section 70. In FIG. 1, a group of normal standing gran culms is denoted with a sign Z0, whereas a group of collapsed grain culms is denoted with a sign Z2, respectively.

In the ceiling portion of the cabin 14, there is also provided a satellite positioning module 80. This satellite positioning module 80 includes a satellite antenna for receiving GNSS (global navigation satellite system) signals (including GPS signals). In order to complement the satellite navigation by the satellite positioning module 80, the satellite positioning module 80 incorporates therein an inertial navigation unit incorporating a gyro acceleration sensor, a magnetic direction sensor. Needless to say, such inertial navigation unit may be disposed at a different place. In FIG. 1, for the sake of convenience of illustration, the satellite positioning module 80 is disposed at a rear portion of the ceiling portion of the cabin 14. However, preferably, the inertial navigation unit 80 can be disposed for instance at a position closer to the machine body center side at the front end portion of the ceiling portion so as to be located immediately upwardly of the left/right center of the cutter device 22.

Figure 2:
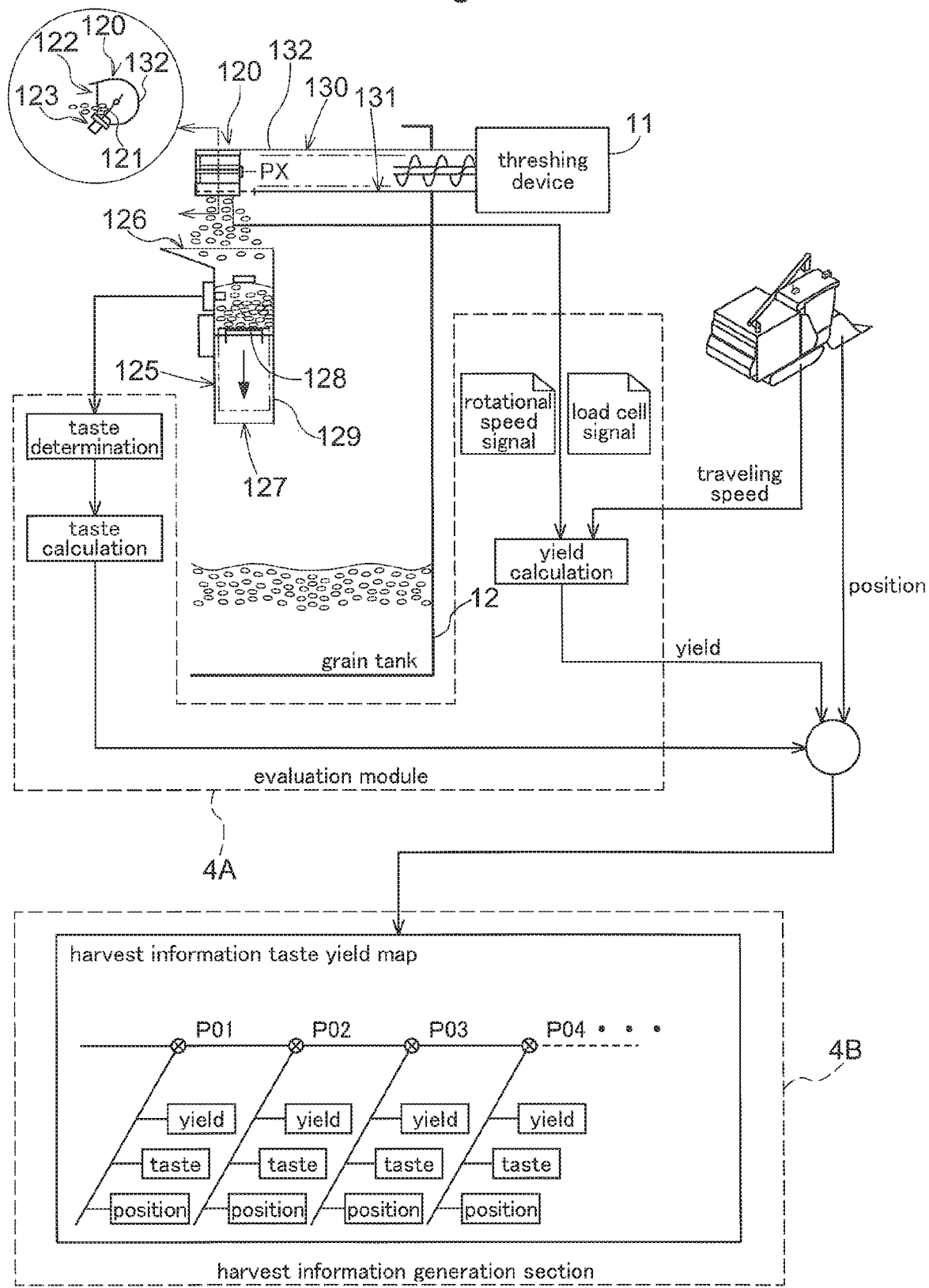
FIG. 2 is a schematic diagram illustrating a process of generating harvest information indicative of taste values and yields obtained by unit traveling.

This combine has a function of calculating a yield and a taste value of grains as a "produce evaluation value" per unit traveling obtained by evaluating agricultural produces that are harvested sequentially and output them. Specifically, as shown in FIG. 2, an amount of grains (namely, a yield) that are supplied into the grain tank 12 from the threshing device 11 over lapse of time and the taste values of the grains (values of moisture, protein thereof, etc.) are determined and then based on the result of such determination, an evaluation module 4A calculates a yield and a taste value as "produce evaluation values" and outputs them.

In the instant embodiment, inside the grain tank 12, there are provided a yield determination unit 120 for the yield determination and a taste value determination unit 125 for the taste value determination (here, moisture and protein values). The yield determination unit 120 is disposed at a terminal area of a grain feeding pipe passage 130 which connects the threshing device 11 to the grain tank 12. At a grain tank inner pipe passage portion of the feeding pipe passage 130, there is provided a screw conveyer 131 which rotates about an axis PX. A terminal end of a housing 132 of the screw conveyer 131 is utilized as a housing for the yield determination unit 120 and there is formed an opening that functions as a discharge outlet 122 of the yield determination unit 120. The yield determination unit 120 includes a discharging rotary body 121 that rotates about the axis PX for discharging the grains sent by the screw conveyer 131 and a load cell structure 123 for detecting the load that occurs at the time of this discharging of grains. The load received by the load cell structure 123 by the grains being discharged from the discharge outlet 122 by the discharging rotary body 121 has correlation with the amount of discharge of grains (namely, a yield) per rotation of the discharging rotary body 121.

In the yield calculation operation which is carried out in the evaluation module 4A, from a rotational speed signal of the discharging rotary body 121 and a load cell signal of the load cell structure 123, a yield per unit time is calculated. Further, based on this yield per unit time and a traveling speed, a unit traveling yield is calculated and outputted as a produce evaluation value.

The taste value determination unit 125 obtains determination values of moisture, protein component through spectrum analysis of light beam irradiated to and returned from grains. In the instant embodiment, the taste value determination unit 125 includes a tubular container 129 having an inlet 126 for receiving at least a portion of grains discharged by the yield determination unit 120 and a discharge outlet 127 for discharging the received grains. Further, the cylindrical container 129 has a shutter 128. This shutter 128, by its opening/closing, allows temporary storage of grains received via the inlet 126 or flow of the grains to the discharging outlet 127.

In the taste value calculation process carried out in the evaluation module 4A, the shutter 128 is switched to a storage (closed) posture and after a predetermined amount of grains has been stored in the cylindrical container 129, the taste value determination in the spectrum determination method is initiated and from the determined values, taste values will be calculated and outputted as produce evaluation values. Upon completion of this taste value determination, the shutter 128 is switched to the discharging (opened) posture to discharge the stored grains. Immediately thereafter, the shutter 128 is returned to the storage posture and proceeds to a next taste value calculation, and taste values calculated one after another will be outputted as produce evaluation values.

In the yield information generation section 4B, the unit traveling yield calculated in the yield calculation process is correlated with the traveling path of the machine body 1 which is obtained from machine body positions calculated by the machine body position calculation section 66. With this, the yields will be recorded one after another in association with harvest work traveling of the combine.

The taste values calculated in the taste value calculation process too are correlated, in the harvest information generation section 4B, with the traveling path of the machine body 1 which is obtained from machine body positions calculated by the machine body position calculation section 66. With this, the taste values will be recorded one after another in association with harvest work traveling of the combine.

Consequently, the unit traveling yields and unit traveling taste values, as "harvest information" will be correlated with the unit traveling distances (denoted with letter P with suffixes in FIG. 2) in the filed. Since the harvest position is computed from a machine body position calculated based on the positioning data from the satellite positioning module 80, it is a position on the map that can be represented in the form of absolute positions represented by longitudes and latitudes, or coordinates positions in a field coordinates system. Therefore, from this harvest information, it is possible to generate a yield map and a taste map showing distributions of yields and tastes per unit traveling distance in the field (consequently, per micro section of the field).

Incidentally, in order to obtain a harvest position from the machine body position calculated based on the positioning data from the satellite positioning module 80, the distance between the antenna of the satellite positioning module 80 and the reaping section 2 and a delay amount from the reaping of grain culms to the yield determination and taste value determination of the grains are preset.

Figure 3:
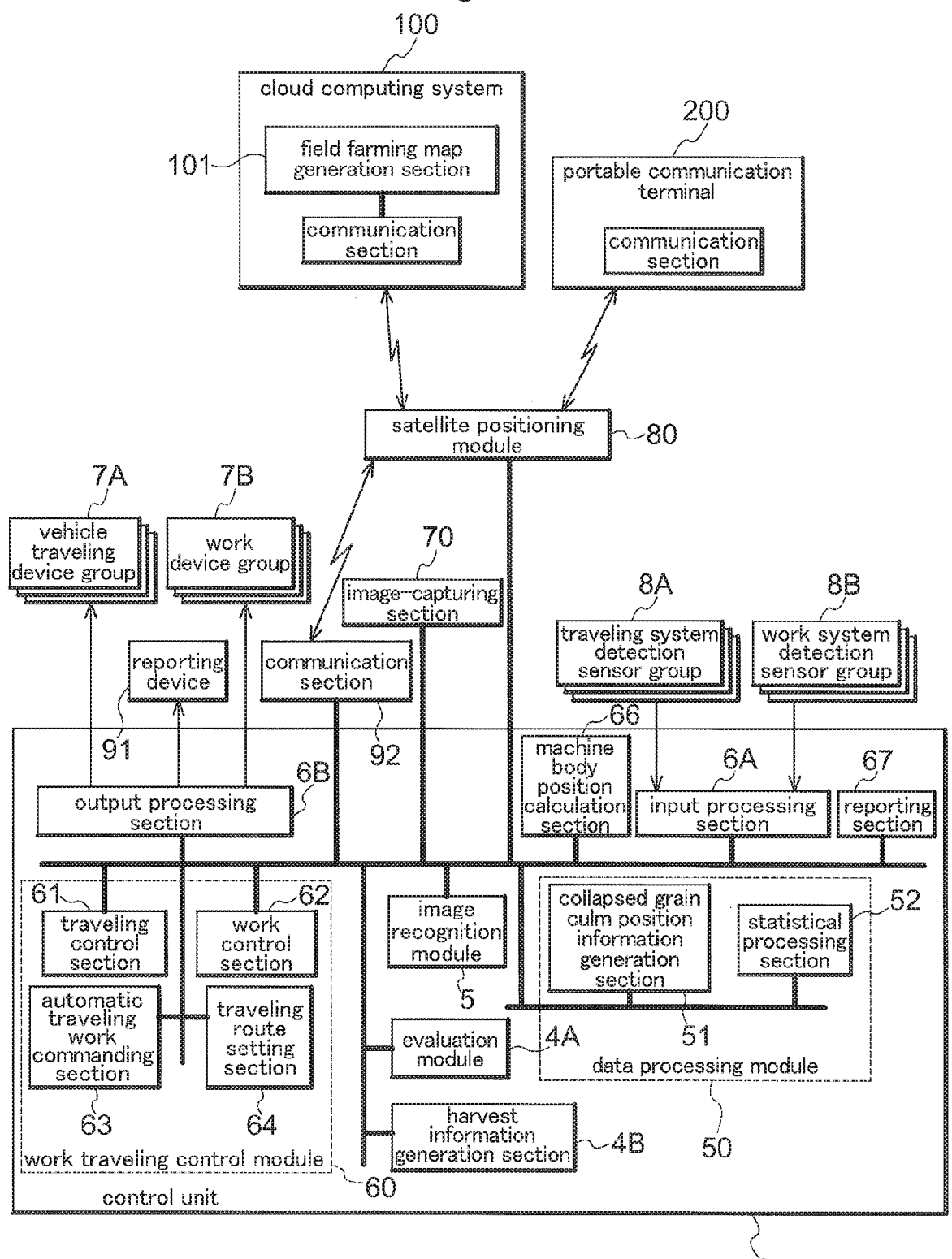
FIG. 3 is a functional block diagram showing various functional blocks included in a control system of the combine.

FIG. 3 shows a functional block diagram of the control system constructed within the machine body 1 of the combine. The control system in the instant embodiment is constituted of many electronic control units called ECU, various kinds of functional devices, groups of sensors and switches, a wiring network such as a vehicle-mounted LAN for carrying out data transmission therebetween, etc. A reporting device 91 is a device for reporting a work traveling condition or various alarms to the driver and constituted of a buzzer, a lamp, a speaker, a display, etc. A communication section 92 is used for the control system of this combine to carry out data exchange with a cloud computing system 100 installed on a remote site or a portable communication terminal 200. Here, the portable communication terminal 200 is constituted of a tablet computer operated by a supervisor (including the driver) on the site of the work traveling. The control unit 6 is the core component of this control system and provided in the form of a group of the plurality of ECU's. Positioning data from the satellite positioning module 80 and image data from the image-capturing section 70 are inputted to the control unit 6 via the wiring network.

The control unit 6 includes, as input/output interfaces, an output processing section 6B and an input processing section 6A. The output processing section 6B is connected to a vehicle traveling device group 7A and a work device group 7B. The vehicle traveling device group 7A includes control devices (e.g. an engine controller, a speed change controller, a braking controller, a maneuvering controller, etc.) relating to vehicle traveling. The work device group 7B includes power controllers of the reaping section 2, the threshing device 11, the grain discharging device 13, the grain culm conveying device 23, etc.

To the input processing section 6A, there are connected a traveling system detection sensor group 8A, a work system detection sensor group 8B, etc. The traveling system detection sensor group 8A includes sensors for detecting states of an engine speed adjusting tool, an accelerator pedal, a brake pedal, a speed changing tool, etc. The work system detection sensor group 8B includes sensors for detecting device states and grain culms or grain states of the reaping section 2, the threshing section 11, the grain discharging device 13, and the grain culm conveying device 23.

The control unit 6 includes a work traveling control module 60, an image recognition module 5, a data processing module 50, the machine body position calculation section 66, the reporting section 67 as well as the evaluation module 4A and the harvest information generation section 4B which were explained with reference to FIG. 2.

The reporting section 67 generates reporting data based on e.g. commands from the respective functional sections of the control unit 6 and provides the data to the reporting device 91. The machine body position calculation section 66 calculates a machine body position which is the map coordinates (or field coordinates) of the machine body 1, based on the positioning data which are transmitted sequentially from the satellite positioning module 80.

The combine of this embodiment can travel in both an automatic traveling mode (automatic maneuvering) and a manual traveling mode (manual maneuvering). The work traveling control module 60 includes an automatic work traveling commanding section 63 and a traveling route setting section 64, in addition to the traveling control section 61 and the work control section 62. Also, inside the cabin 14, there is provided a traveling mode switch (not shown) for selecting either the automatic traveling mode for traveling by automatic maneuvering and the manual maneuvering mode for traveling by manual maneuvering. By operating this traveling mode switch, change from the manual maneuvering traveling to the automatic maneuvering traveling or from the automatic maneuvering traveling to the manual maneuvering traveling can be made.

The traveling control section 61 includes an engine control function, a maneuvering control function, a vehicle speed control function, etc. and provides traveling control signals to the vehicle traveling device group 7A. The work control section 62 provides work control signals to the work device group 7B in order to control movements of the reaping section 2, the threshing device 11, the grain discharging device 13, the grain culm conveying device 23, etc.

When the manual maneuvering mode is selected, based on an operation by a driver, the traveling control section 61 generates control signals and controls the vehicle traveling device group 7A. When the automatic maneuvering mode is selected, based on an automatic traveling command provided by the automatic work traveling commanding section 63, the traveling control section 61 controls the vehicle traveling device group 7A relating to maneuvering and the vehicle traveling device group 7A relating to the vehicle speed.

The traveling route setting section 64 maps in a memory a traveling route for automatic traveling generated in any one of the control unit 6, the portable communication terminal 200, the cloud computer system 100, etc. The traveling route mapped in the memory will be used as a target traveling route in the automatic traveling sequentially. This traveling route can be utilized also for both the manual traveling and the guidance for the combine to travel along this traveling route.

More particularly, the automatic work traveling commanding section 63 generates an automatic maneuvering command and a vehicle speed command and provides these to the traveling control section 61. The automatic maneuvering command will be generated in such a manner as to resolve any positional or directional displacement if any between the traveling route mapped by the traveling route setting section 64 and the self vehicle position calculated by the machine body position calculation section 66. The vehicle speed command is generated based on a preset vehicle speed value. Further, the automatic work traveling commanding section 63 provides the work control section 62 with an implement operation command in accordance with the self vehicle position or a traveling state of the self vehicle.

The image recognition module 5 inputs image data of captured images acquired continuously and sequentially by the image capturing section 70. The image recognition module 5 estimates a presence area where a recognition target in the captured-images is present and outputs, as recognition result, recognition output data including the presence area and estimation probability in case the presence area was estimated. The image recognition module 5 is constructed with using a neural network technology employed deep learning.

Figure 4:
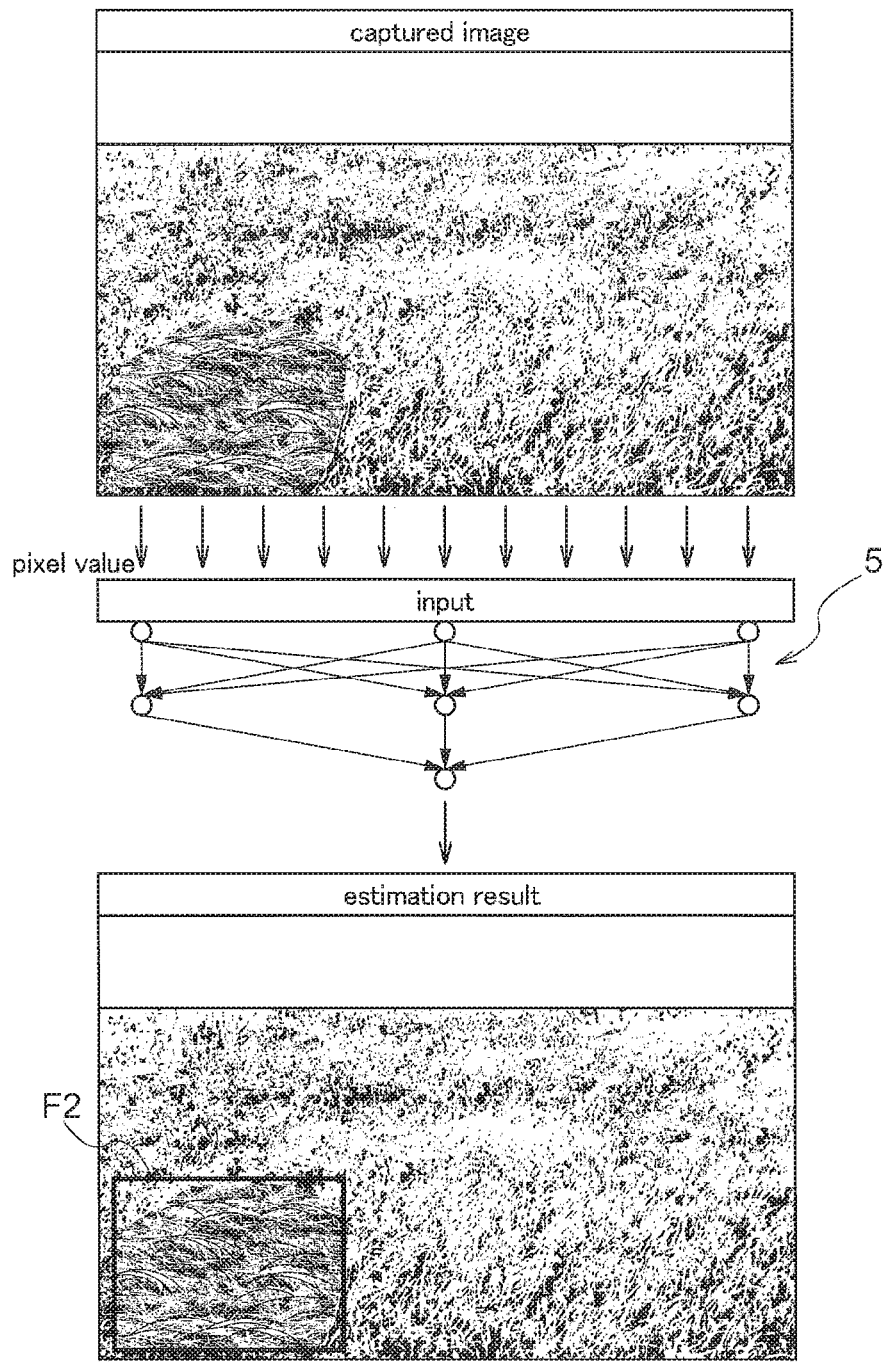
FIG. 4 is an explanatory view schematically showing a flow of generation of recognition output data by an image recognition module.
Figure 5:
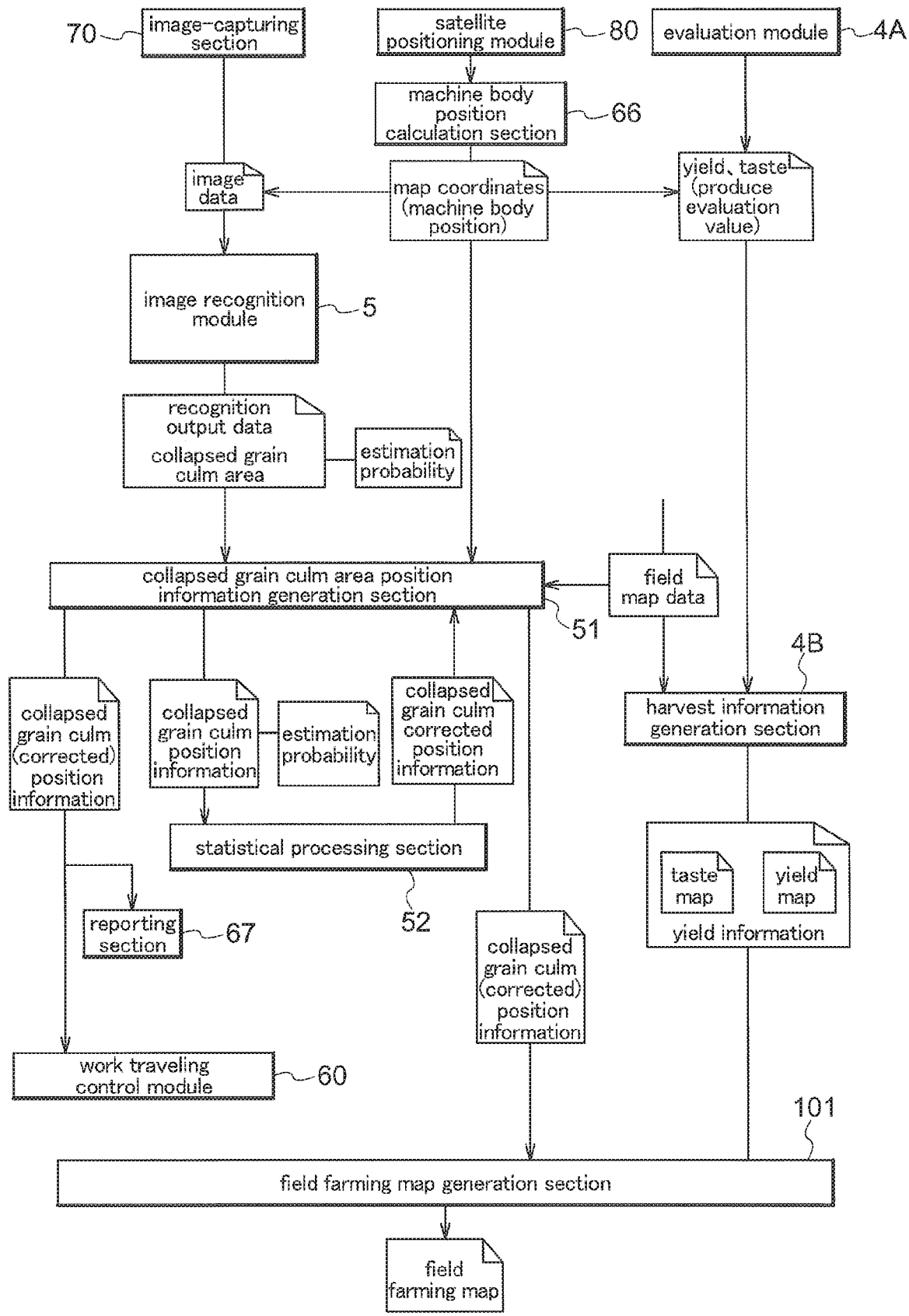
FIG. 5 is a diagram showing data flow for generating a field farming map from a captured image.

FIG. 4 and FIG. 5 show a flow of generation of recognition output data by the image recognition module 5. The image recognition module 5 inputs pixel values of RGB image data as input values. In the instant embodiment, the recognition target to be estimated is the presence area of a collapsed grain culm(s) (to be referred to as "collapsed grain culm area" hereinafter). Therefore, the recognition output data as recognition result include a collapsed grain culm area indicated by a rectangle and the estimation probability at the time of estimation of the collapsed grain culm area.

FIG. 4 shows the estimation result schematically, the collapsed grain culm area being denoted with a rectangular frame added with a sign F2. The collapsed grain culm area is delimited by respective four corner points. Coordinate positions on the captured image of such four corner points of the rectangle are included also in the estimation result. Needless to say, if no collapsed grain culm as a recognition target is estimated, no collapsed grain culm area will be outputted and its estimation probability will become zero.

Incidentally, in this embodiment, the image recognition module 5 has its internal parameters set such that the farther the recognition target (collapsed grain culm) from the image capturing section 70 in the captured image, the lower the estimation probability of this recognition target. With this arrangement, recognition of a recognition target in an image capturing area having a lower resolution as being located far from the image capturing section 70 is made stricter, thus reducing erroneous recognition.

The data processing module 50 processes the recognition output data outputted from the image recognition module 5. As shown in FIG. 3 and FIG. 5, the data processing module 50 provided in this embodiment includes a collapsed grain culm position information generation section 51 and a statistical processing section 52.

The collapsed grain culm position information generation section 51 generates collapsed grain culm position information indicative of the position of the recognition target on the map, from the machine body position at the time of the acquisition of the captured image and the recognition output data. The position of the presence of the collapsed grain culm on the map included in the recognition output data can be obtained by converting the coordinate positions (camera coordinate positions) on the captured image of the four corner points of the rectangle representing collapsed grain culm into coordinates on the map.

The image capturing section 70 acquires a captured image by a predetermined time interval (e.g. interval of 0.5 second) and inputs its image data to the image recognition module 5. So, the image recognition module 5 too outputs the recognition output data by the same time interval. Therefore, in case a collapsed grain culm is included in the image capturing field of the image capturing section 70, normally, a plurality of recognition output data will include a present area for the same collapsed grain culm. As a result, for a same collapsed grain culm, a plurality of collapsed grain culm information can be obtained. In this, the estimation probabilities included in the recognition output data as the respective source data (that is, the estimation probabilities of the presence area of the collapsed grain culm included in the collapsed grain culm position information) will often have different values as the positional relations between the image capturing section 70 and the collapsed grain culm differ from each other.

Therefore, in this embodiment, such plurality of collapsed grain culm information will be stored and a statistical computation will be effected on the estimation probabilities included in the stored respective plurality of collapsed grain culm position information. With using such statistical computation on the estimation probabilities included in the plurality of recognition target position information, a representative value of the estimation probabilities group will be obtained. And, with use of this representative value, the plurality of recognition target position information can be corrected into a single optimal recognition target position information. According to one example of such correction, a collapsed grain culm corrected position information will be generated such that an arithmetic average value or a weight average value or a median value of the respective estimation probability will be obtained as a reference value (a representative value) and then a logical sum of presence areas having estimation probabilities equal to or higher than the reference value will be obtained as this will be set as the optimal presence area. Needless to say, it is also possible to generate one highly reliable collapsed grain culm position information with use of some other statistical computation than the one described above.

With use of the collapsed grain culm position information indicative of the position of the map of the collapsed grain culm area obtained as described above, at the time of recognition of a collapsed grain culm, each preset traveling work control or alarm reporting will be effected.

The evaluation module 4A, as described above, will calculate a taste value of grain (a produce evaluation value) through a taste calculation process and calculate a yield of grain (a produce evaluation value) through a yield calculation process. Taste values and yields outputted sequentially from the evaluation module 4A in association with progress of a work traveling will be provided to the yield information generation section 4B. The harvest information generation section 4B will record the sequentially provided taste values and yields in correlation with the traveling path of the machine body 1, thus generating harvest information.

In this embodiment, the harvest information generated by the harvest information generation section 4B and the collapsed grain culm position information generated by the collapsed grain culm position information generation section 51 are uploaded to the cloud computing system 100 through the communication section 92. In this cloud computing system 100, there is constructed a field farming map generation section 101 configured to map-align the collapsed grain culm position information and the harvest information to generate a field farming map.

Figure 6:
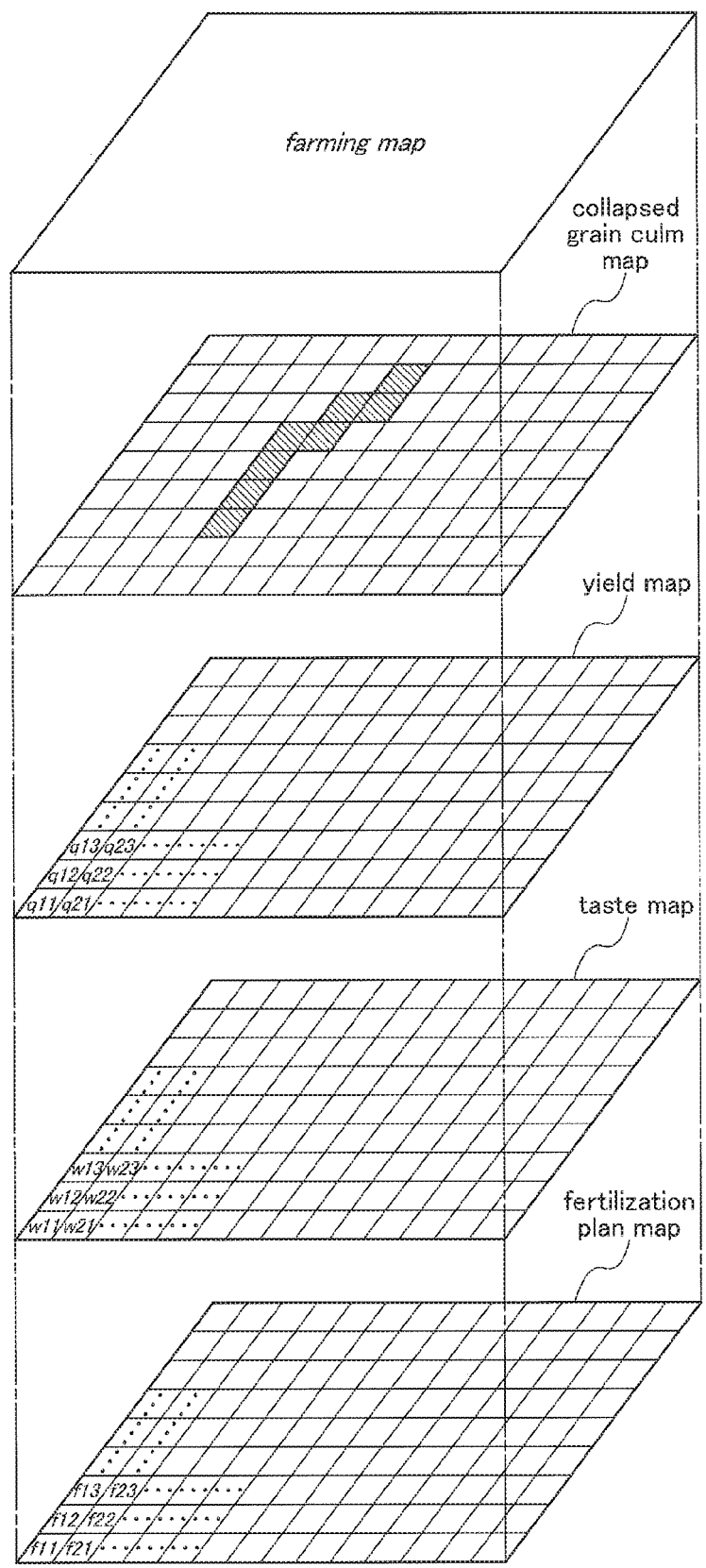
FIG. 6 is a diagram showing one example of the field farming map.

FIG. 6 schematically shows one example of such field farming map. In this field farming map, there are included a collapsed grain culm map in which the presence area of collapsed grain culm (indicated by diagonal lines) is assigned to micro sections set in a field, a yield map in which the yields (denoted with q11, . . . ) are assigned to the same micro sections, and a taste value map in which the taste values (denoted with w11, . . . ) are assigned to the same micro sections. In this field farming map, there is also included a fertilization plan map recording next fertilization amounts (denoted with f11 . . . ) in the same micro sections. Incidentally, in the case of the example shown in FIG. 6, sections having a same size are employed as the micro sections in the respective maps. However, sections having different sizes may be used instead.

In calculations of a type of fertilizer and its fertilization amount in a same micro section needed in the generation of a fertilization plan map, since collapsed grain culm occurs due mainly to excess of fertilizer, the presence area of collapsed grain culm and the yield and taste value in the presence area of the collapsed grain culm will be referred to so that the growth of grains will be suppressed to some extent.

The calculations of the type of the fertilizer and the fertilization amount can be made automatically by a computer software or can be carried out by a farmer with reference to the field farming map. Further alternatively, it is also possible to employ a semi-automatic method in which a farmer corrects a fertilization amount calculated by a computer software.

Incidentally, the configurations disclosed in the above-described embodiment (including the further embodiments, and the same hereinafter) can be applied in combination with the configurations disclosed in the other embodiments) as long as no contradiction results from such combination (s). The embodiments disclosed in the present specification are merely exemplary, and the embodiments of the present invention are not limited thereto, but can be modified appropriately without departing from the subject of the present invention.

Other Embodiments (1) In the foregoing embodiment, a collapsed grain culm is set as the recognition target to be recognized by the image recognition module 5. However, any other recognition target (e.g. a group of weed grown higher than standing grain culms or an obstacle such as a human, etc.) can be set additionally. In such case, the work traveling control module 60 will be configured to effect a necessary control in response to recognition of weed group or obstacle.

(2) In the foregoing embodiment, the image recognition module 5 is constructed with use of a deep learning type neural network technology. Instead of this, it is also possible to employ an image recognition module 5 constructed with using any other machine learning technique.

(3) In the foregoing embodiment, the image recognition module 5, the data processing module 50, the evaluation module 4A, the harvest information generation section 4B were incorporated within the control unit 6 of the combine. Alternatively, some or all of them may be constructed in a control unit (e.g. the portable communication terminal 200, etc.) independent from the combine.

(4) The respective functional sections shown in FIG. 3 are sectioned mainly for the sake of explanation. Thus, in actuality, each functional section may be integrated with any other functional section or may be further divided in to a plurality of functional sections.

INDUSTRIAL APPLICABILITY

The present invention is applicable to any harvest machine having a function of image-capturing a field and a function of calculating a machine body position, including not only a combine for harvesting rice or wheat, but also to a combine for harvesting any other agricultural produce such as corn, or a harvest machine for harvesting carrot or the like.

DESCRIPTION OF SIGNS

1: machine body
2: reaping section
4A: evaluation module
4B: harvest information generation section
5: image recognition module
50: data processing module
51: collapsed grain culm position information generation section
52: statistical processing section
57: machine body position calculation section
6: control unit
6A: input processing section
6B: output processing section
60: work traveling control module
61: traveling control section
62: work control section
63: automatic work traveling commanding section
64: traveling route setting section
66: machine body position calculation section
70: image-capturing section
80: satellite positioning module
91: reporting device
120: yield determination unit
125: taste value determination unit
100: cloud computing system
101: field farming map generation section
200: portable communication terminal

The invention claimed is:

1. A combine for harvesting agricultural produces while traveling in a field, the combine comprising:
a machine body position calculation section for calculating a machine body position comprising map coordinates of a machine body based on positioning data from a satellite positioning module;
an image capturing section provided in the machine body and configured to image-capture the field at time of a harvesting work;
an image recognition module configured to input image data of captured images sequentially acquired continuously by the image capturing section and to estimate a collapsed grain culm area in the captured images and then to output recognition output data indicative of the estimated collapsed grain culm area;
an evaluation module configured to output a produce evaluation value per unit traveling acquired by evaluating the agricultural produces that are harvested sequentially;
a collapsed grain culm position information generation section configured to generate collapsed grain culm position information indicative of a position of the collapsed grain culm area on a map, based on the machine body position at the time of the acquisition of the captured image and the recognition output data; and
a harvest information generation section configured to generate harvest information from the machine body position at the time of harvest of the agricultural produces and the produce evaluation value, wherein the produce evaluation value includes a yield,
wherein a field farming map generation section for generating a field farming map including a collapsed grain culm map in which a presence area of collapsed grain culm is assigned to micro sections set in the field from the collapsed grain culm position information, a yield map in which yields are assigned to the same micro sections from the harvest information, and a fertilization plan map recording next fertilization amounts in the same micro sections calculated from the collapsed grain culm position information and the harvest information in the same micro sections is constructed in a control system within the machine body or in a cloud computer system.

2. A method of generating a field farming map, the method comprising:
a step of outputting recognition output data indicative of a collapsed grain culm area estimated based on a captured image acquired by an image capturing section provided in a combine;
a step of generating collapsed grain culm position information indicative of a position on a map of the collapsed grain culm area from a machine body position at the time of the acquisition of the captured image and the recognition output data;
a step of outputting a produce evaluation value per unit traveling obtained by evaluating agricultural produces that are harvested sequentially by work traveling of the combine in a field;
a step of generating harvest information from the machine body position at the time of acquisition of the harvest of the agricultural produces and the produce evaluation value, wherein the produce evaluation value includes a yield; and
a step of generating the field farming map by generating a collapsed grain culm map in which a presence area of collapsed grain culm is assigned to micro sections set in the field from the collapsed grain culm position information, a yield map in which yields are assigned to the same micro sections from the harvest information, and a fertilization plan map recording next fertilization amounts in the same micro sections calculated from the collapsed grain culm position information and the harvest information in the same micro sections.

3. A computer program product comprising at least one non-transitory computer-readable medium including program instructions for a field farming map generating program that, when executed by at least one processor, cause the at least one processor to perform:
a function of outputting recognition output data indicative of a collapsed grain culm area estimated based on a captured image acquired by an image capturing section provided in a combine;
a function of generating collapsed grain culm position information indicative of a position on a map of the collapsed grain culm area from a machine body position at the time of the acquisition of the captured image and the recognition output data;

a function of outputting a produce evaluation value per unit traveling obtained by evaluating agricultural produces that are harvested sequentially by work traveling of the combine in a field;

a function of generating harvest information from the machine body position at the time of acquisition of the harvest of the agricultural produces and the produce evaluation value wherein the produce evaluation value includes a yield; and a function of generating the field farming map by generating a collapsed grain culm map in which a presence area of collapsed grain culm is assigned to micro sections set in the field from the collapsed grain culm position information, a yield map in which yields are assigned to the same micro sections from the harvest information, and a fertilization plan map recording next fertilization amounts in the same micro sections calculated from the collapsed grain culm position information and the harvest information in the same micro sections.

4. A field farming map generating system comprising:
one or more processors programmed and/or configured to:
output data indicative of a collapsed grain culm area estimated based on a captured image acquired by an image capturing section provided in a combine;

generate collapsed grain culm position information indicative of a position on a map of the collapsed grain culm area from a machine body position at the time of the acquisition of the captured image and the recognition output data;

output a produce evaluation value per unit traveling obtained by evaluating agricultural produces that are harvested sequentially by work traveling of the combine in a field;

generate harvest information from the machine body position at the time of acquisition of the harvest of the agricultural produces and the produce evaluation value, wherein the produce evaluation value includes a yield; and generate the field farming map by generating a collapsed grain culm map in which a presence area of collapsed grain culm is assigned to micro sections set in the field from the collapsed grain culm position information, a yield map in which yields are assigned to the same micro sections from the harvest information, and a fertilization plan map recording next fertilization amounts in the same micro sections calculated from the collapsed grain culm position information and the harvest information in the same micro sections.

\* \* \* \* \*